United States Patent [19]

Kobayashi et al.

[11] 3,964,097
[45] June 15, 1976

[54] MULTI-CARTRIDGE APPARATUS FOR RECORDING AND REPRODUCING AUDIO SIGNALS AUTOMATICALLY AND SUCCESSIVELY

[75] Inventors: Tamio Kobayashi, Hirakata; Tadashi Torama, Osaka, both of Japan

[73] Assignee: Matsushita Electric Industrial Co., Ltd., Osaka, Japan

[22] Filed: Dec. 18, 1973

[21] Appl. No.: 425,796

[30] Foreign Application Priority Data

| Dec. 30, 1972 | Japan | 48-3963 |
| Dec. 30, 1972 | Japan | 48-3964 |
| Dec. 30, 1972 | Japan | 48-3965 |
| Dec. 30, 1972 | Japan | 48-3966 |
| Dec. 30, 1972 | Japan | 48-3967 |
| Dec. 30, 1972 | Japan | 48-3968 |
| Dec. 30, 1972 | Japan | 48-3969 |
| Dec. 30, 1972 | Japan | 48-3970 |
| Dec. 30, 1972 | Japan | 48-3971 |
| Dec. 30, 1972 | Japan | 48-3972 |
| Dec. 30, 1972 | Japan | 48-3973 |
| Dec. 30, 1972 | Japan | 48-3974 |
| Dec. 30, 1972 | Japan | 48-3975 |
| Dec. 30, 1972 | Japan | 48-3976 |

[52] U.S. Cl. .................................................. 360/92
[51] Int. Cl.² .......................................... G11B 15/68
[58] Field of Search .................. 360/92, 94, 91; 226/109; 242/84.52 B

[56] References Cited

UNITED STATES PATENTS

| 3,431,367 | 3/1969 | Nickl | 360/92 |
| 3,552,751 | 1/1971 | Kelso | 360/94 |
| 3,583,708 | 6/1971 | Prager | 360/94 |
| 3,698,722 | 10/1972 | Ban | 360/92 |
| 3,730,532 | 5/1973 | Miyamoto | 360/93 |
| 3,752,484 | 8/1973 | Ban | 360/92 |
| 3,825,949 | 7/1974 | Pyles | 360/91 |

*Primary Examiner*—Daryl W. Cook
*Attorney, Agent, or Firm*—Stevens, Davis, Miller & Mosher

[57] ABSTRACT

The apparatus to which the present invention relates comprises at least two spaces defined by at least one partition wall provided between upper and lower base plates, each space being intended for receiving one cartridge; it is thus possible to accommodate at least two cartridges in a superimposed manner. In each space, there are provided a head for effecting recording and reproducing, and a capstan for advancing the tape in the cartridge.

In addition, means are provided in each space for holding the cartridge at its waiting position where the tape and the pinch roller in the cartridge are spaced from the head and the capstan, respectively, for automatically and successively selectively advancing the cartridge to record/reproduce a position and for retaining the cartridge thereat where the tape and the pinch roller make contact with the head and the capstan respectively.

13 Claims, 11 Drawing Figures

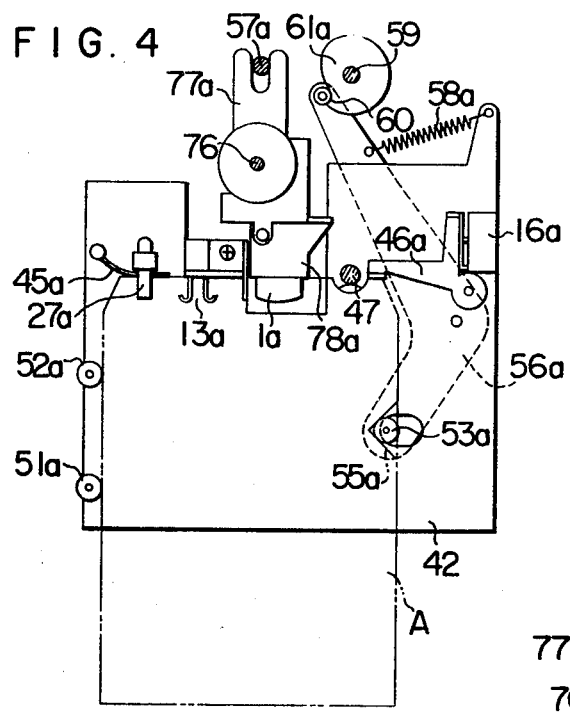
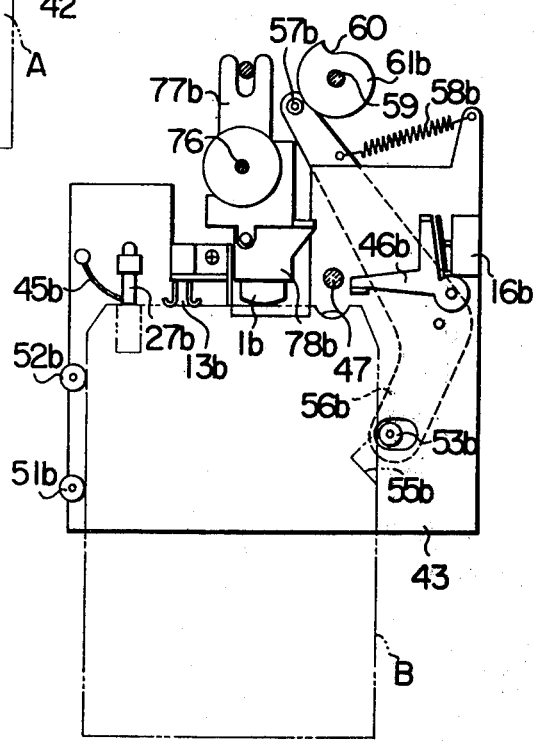

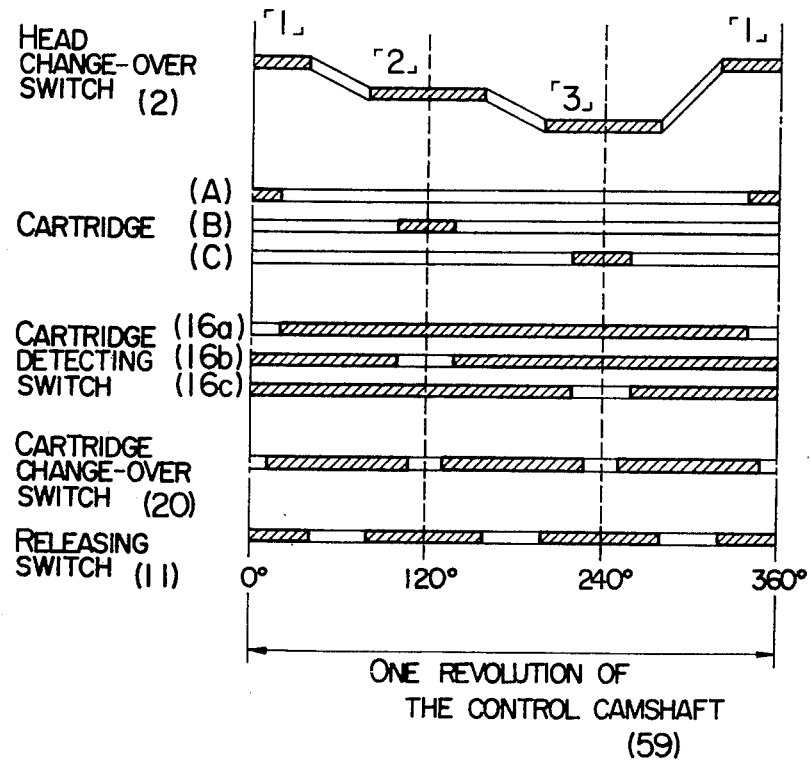

MULTI-CARTRIDGE APPARATUS FOR RECORDING AND REPRODUCING AUDIO SIGNALS AUTOMATICALLY AND SUCCESSIVELY

BACKGROUND OF THE INVENTION

Apparatus are known for automatically and successively recording and reproducing on and from a plurality of cartridges.

In such apparatus, it is required that the cartridges are successively or selectively moved one by one to a position for operation to be retained thereat; the retained cartridge is immediately released from the operating position to a waiting position upon the ending of the tape in the cartridge, in order to obtain a good and perfect recording and 1 or reproduction.

This invention is aimed at providing an improved apparatus of the type as aforementioned in which the above requirements, as well as various requirements which have not been satisfied completely up to now, are perfectly satisfied.

DETAILED DESCRIPTION OF INVENTION

This invention relates to an apparatus for recording and reproducing, especially of a type loaded with a plurality of cartridges which are adapted to be employed one by one for recording and reproducing audio signals selectively and automatically in succession.

Many apparatus of this type have been well known and found useful, but, unfortunately, do not sufficiently satisfy various requirements as described hereinafter.

These requirements are:

1. The operation for moving the cartridges to a position for recording and reproducing and retaining the cartridge thereat, as well as the operation for releasing or disengaging the completed cartridge must be done without failure.

Any failure in these operations would lead lad to a bad state of recording and reproducing, and even to an impossibility of recording and reproducing.

2. In the apparatus of this type, a number of recording and reproducing heads are provided corresponding to the number of the cartridges.

It is required that the heads must be so arranged that the head corresponding to the selected cartridge can readily be engaged with the cartridge, in order to obtain a satisfactory recording and reproducing with the series of cartridges.

Furthermore, the head thus engaged must function without fail in order to obtain good recording and reproducing.

3. It is necessary that the head is correctly selected and operated in accordance with th selection of the cartridge to avoid incomplete recording and reproducing, which would necessarily affect the automatic and successive recording and reproducing with the series of the cartridge.

4. It is required that the selection of the cartridge and the corresponding selection of the head must be done in accordance with a selecting order to obtain a successful recording and reproducing with successive cartridges. It is also required that the cartridge which is employed for recording and reproducing be definitely released to a waiting position as a power source switch is turned off, even when the recording and reproducing operation is unfinished.

Without this arrangement, the mechanical means related to the cartridge are inconveniently left in their operating position for a long time, and one cannot extract the uncompleted cartridge.

5. The arrangement must be such that recording or the reproducing may be stopped at anytime and the cartridge which is to be employed next is promptly employed for recording or reproducing skipping over the remainder of th program in the antecedent cartridge.

This arrangement would enable one to select the cartridge in which he is interested when he no longer hopes to continue the reproducing or recording operation with the cartridge now employed.

6. It is preferable that means are provided for stopping the apparatus automatically when the recording or reproducing is finished with the last cartridge.

Such means would render the apparatus usable for a sleeping timer.

7. It is required that the reproducing with one cartridge can be repeated as required without employing the subsequent cartridges. This may be required also in the case of recording.

Otherwise, one can record or reproduce the first program only after the programs of all cartridges are finished.

8. It is preferable that means are provided for detecting and indicating which one of the cartridges is in use, which program of the cartridge is being reproduced or recorded, and whether the cartridge in use is for four-channels or for two channels.

This means should effect, as well as indication, operations of the related means in accordance with the detection.

9. Further, the program should be changed also on manual operation.

10. Relative to item 6, the means for stopping should function as necessary upon termination of the program of the cartridge which is actually in use, as well as upon termination of the program of the last cartridge.

The present invention provides an improved apparatus of above described type in which the aforementioned requirements are satisfied perfectly well.

According to the present invention, there is provided a multi-cartridge type apparatus for recording and reproducing audio signals automatically and successively, in which the selective retaining and releasing of the cartridge is effected surely by means of mechanical operations.

More specifically, according to the invention, there is provided a controlling mechanism including a plurality of locking cams each corresponding to each cartridge and including lock levers each being arranged to be actuated by each of said locking cams.

The cams are operated through suitable means by making use of a torque for driving the capstan so that the levers can conveniently move and retain the cartridges into and at the record/reproduce position. In addition, spring means are provided for releasing the cartridges from the operating position to a waiting position.

In a further aspect of the invention, a plurality of locking levers and a plurality of locking cams are provided, both of which correspond to the number of cartridges.

The cams are mounted on a common control camshaft with a suitable phase difference between each, so that the locking cams may actuate the locking levers in accordance with a predetermined selecting order. Thus, the cartridges are moved into position or released in accordance with the selecting order, upon rotation of the control cam shaft.

In still further aspects, the present invention provides a plurality of heads each intended for one cartridge, thus promising readiness and accuracy for the engagement of the head with the cartridge.

It is arranged that among the heads, the one which corresponds to the selected cartridge; i.e. the cartridge retained at the record/reproduce position, is correctly selected to be operated by a head change-over switch, which switch is operated by a switch change-over cam.

The switch change-over cam may be one which comprises a plurality of cam slopes the number of which corresponds to the number of cartridges.

In still further aspects, the locking cams and the switch change-over cam are mounted on the control cam shaft, wherein both cams are arranged in such a manner that the selection of the head is made conveniently in accordance with the selection of the cartridge upon rotation of the control cam shaft.

Thanks to this arrangement, only the head corresponding to the selected cartridge becomes available for recording and reproducing.

In a still further aspect of the invention, a control solenoid is provided for optionally transferring the torque to the control cam shaft.

This control solenoid is fed with electric power through a first circuit including a main power switch and through a second circuit which runs in parallel with the first one.

When the main power switch is turned off, the control solenoid is energized through the second circuits so that the control cam shaft is rotated until the locking lever for the working cartridge releases the cartridge from the record/reproduce position.

Upon the release of the cartridge, the second circuis are cut to stop the current to the control solenoid. Thus, it is assured that the apparatus is stopped only after all of the cartridges are released from the operating to the waiting position, even when the main power switch is opened during recording or reproducing with any of the cartridges.

Needless to say, the cutting of the second circuit is made during a short period after the lock lever releases the cartridge, and before the next lock lever moves the next cartridge into its operating position.

In a still further aspect, a manually operable cartridge change-over switch is provided in parallel with the automatic cartridge change-over switch which is adapted for selecting the cartridge in accordance with the predetermined selecting order. Both of these switches are capable of feeding power to the control solenoid, thus an optional selection of the cartridge, as well as the automatic selection, is conveniently effected upon actuation of both switches. Thus, the recording of reproducing operation is optionally stopped even it is unfinished, and the next cartridge is moved to the operating position from the waiting position, skipping over the remainder of the program in the preceding cartridge.

In further aspect, there are provided a solenoid for automatic stopping, a condenser for automatic stopping upon discharging from which the solenoid for automatic stopping is energized, and a switch for selecting the stop timing which is adapted for controlling the timing for charging and discharging of the condenser.

Owing to this arrangement, it becomes possible to stop the apparatus just before the first cartridge is selected for the second time, after completion of the last cartridge.

The discharged current from the condenser is fed to the solenoid through a switch for automatic stopping which is optionally opened and closed.

In a still further aspect, sensing switches are provided for each cartridge at the spaces for receiving the cartridges. These sensing switches are for detecting the termination of the program of each cartridge and are made parallel with each other. A repeat switch which is operable manually is connected to the sensing switches so that the currents to all sensing switches are optionally cut by opening the repeat switch.

Thus, when recording or reproducing is finished with a cartridge the sensing switch cannot detect the finish so that the recording or reproducing is repeated once again with the finished cartridge, provided that the repeat switch is opened.

In a still further aspect, a plurality of indicating means are provided corresponding to the number of the cartridges, so that one can readily and accurately recognize which one of the cartridges is actually recording or reproducing. The indicating means are selected by a change-over switch which is operated in an interlocked manner with the selection of the cartridge so that only the indicating means corresponding to the selected cartridge is actuated.

In a still further aspect, there are provided a detecting means for each cartridge to detect whether the cartridge is for four-channels or for two channels, a change-over switch to select the detecting means corresponding to the working cartridge, and a means for indicating whether the cartridge is for four-channels or for two-channels upon receipt of signals from the detecting means.

Thus, one can readily know whether the working cartridge is for four-channels or for two channels.

In a still further aspect, there are provided an output change-over switch which acts to select one from the four-channels output circuit and two-channel output circuit and a relay for effecting the selecting motion of the output change over switch upon receipt of signals from the detecting switch for detecting the channels with the cartridge.

Thus, when the cartridge moved to the operating position is for four channels, the output circuit for four-channels is selected accordingly, and when the cartridge is for two-channels the selected output circuit is for two-channels the selected output circuit is for two-channels.

In a further aspect, the cartridge change-over switch for effecting the rotation of the control cam shaft is controlled by a cam which is mounted on the control cam shaft, so that the current for the cartridge change-over switch may be cut to stop the control cam shaft when the movement of the cartridge to the operating position is completed.

In a still further aspect, there is provided a manually operable switch for changing the programs so that one can optionally change the programs being recorded or reproduced.

In a still further aspect, means are provided for indicating the program which is actually carried on.

In a still further aspect, means are provided for selecting one of two modes of automatically stopping the apparatus, one being such that the apparatus is stopped when recording and reproducing of all cartridges is finished, the other being such that the apparatus is stopped when recording or reproducing of the current operating cartridge is finished. Accordingly, the objects of the invention can be listed as below.

An object of the invention is to make it possible to move a selected cartridge to a record/reproduce position, to retain the cartridge in the operating position, and to release the retained cartridge to a waiting position after the recording or reproducing operating is finished.

Another object is to make it possible to employ the cartridges for operation one by one in accordance with a predetermined selection order.

A further object is to make it possible to readily engage the heads with the corresponding cartridges and to actuate the head which corresponds to the selected cartridge.

A further object is to make it possible to correctly select the heads and actuator in accordance with the selection of the cartridges.

A further object is to make it possible to correctly effect the selection of the heads and the selection of the cartridges in accordance with a predetermined selecting order of the cartridges.

A further object is to make it possible to properly release the cartridge which has been employed for operation from the operating position to the waiting position, when the power switch is turned to off midway of the recording or reproducing operation.

A further object is to release the cartridge automatically when the power switch is turned off midway of the recording or reproducing operation, in relation with the motion of the lock cam which corresponds to the cartridge.

A further object is to make it possible to optionally select the cartridge which is second to the one under operation, even when the recording or reproducing operation of the first cartridge is unfinished.

A further object is to make it possible to automatically stop the apparatus just before the first cartridge is moved to the operating position for the second time, after the last cartridge is released.

A further object is to make it possible to stop the apparatus when recording or reproducing of the current cartridge is finished.

A further object is to make it possible to optionally repeat the recording or reproducing operation with one cartridge.

A further object is to enable one to readily recognize which one of the cartridges and the programs is actually under operation.

A further object is to enable one to readily recognize whether the cartridge under operation is for four-channels or for two-channels.

A further object is make it possible to automatically select the one output circuit from four-channel circuit and two-channel circuit upon detecting the channels with the cartridge under operation.

A further object is to enable one to optionally select the program by a manual operation.

A further object is to make it possible to select the mose of automatic stopping of the apparatus from among two modes, the one mode being such that the apparatus is automatically stopped when recording or reproducing is finished with all cartridges, the other mode being such that the apparatus is automatically stopped when recording or reproducing is finished with the cartridge currently in operation.

These and other objects of the invention, as well as many advantages derived from the invention will be fully understood through the explanation of an embodiment.

One embodiment according to the present invention will be described, by way of an example, with reference to the accompanying drawings, in which:

FIGS. 4 to 6 are plan views showing respective arrangements corresponding to each cartridge, in turn from an upper stage;

FIG. 11 shows a timing relation between a rotation of the control camshaft and corresponding parts.

The embodiment shown in the above figures uses three eight-track cartridges, and is arranged to enable the charged cartridges to be successively recorded and reproduced, in either mode of a two-channel stereo system and a four-channel stereo system. In this embodiment only the reproducing apparatus is illustrated; however it is of course apparent that the apparatus is available for both reproducing and recording, provided that the heads and amplifiers are arranged appropriately, in any known manner.

Figure 1:
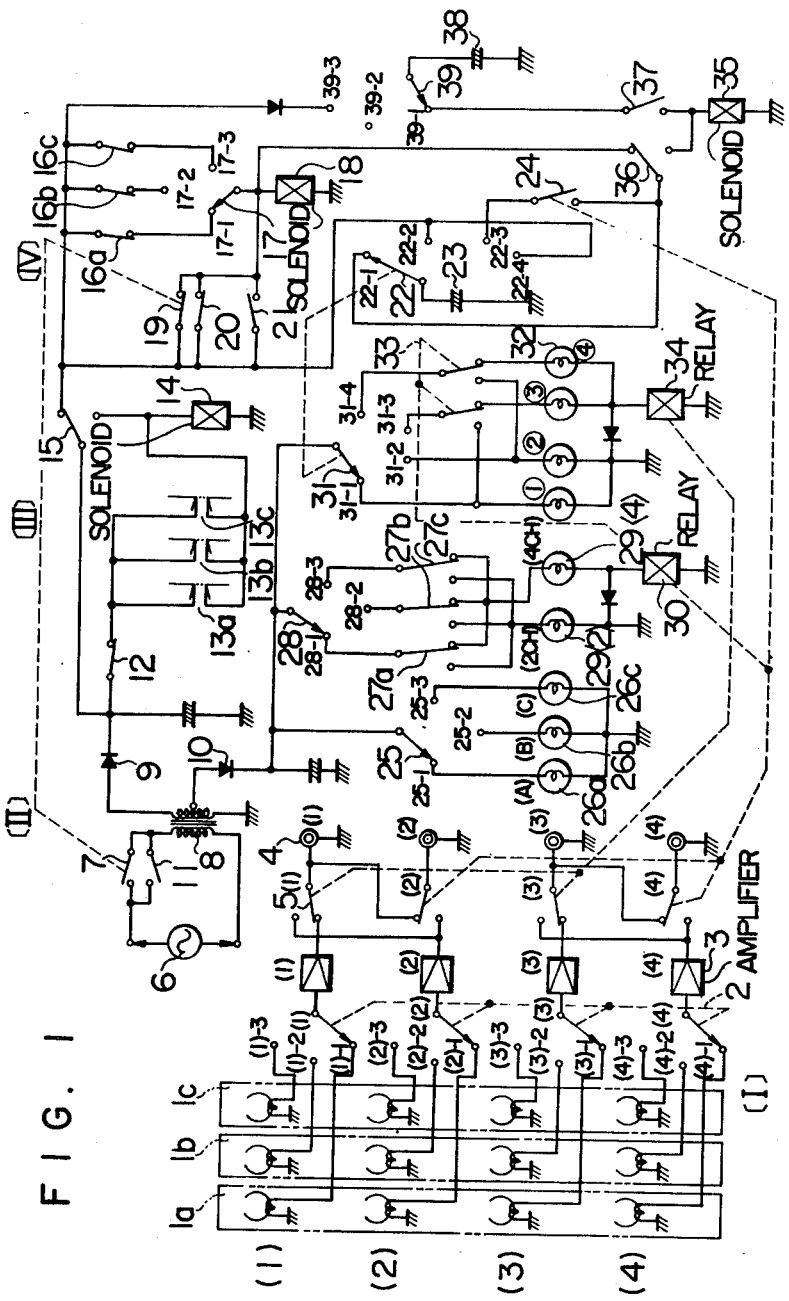
FIG. 1 is a circuit diagram showing a circuit arrangement of an apparatus of the multi-cartridge type for recording and reproducing audio signals automatically and successively carried out by the present invention.
Figure 2:
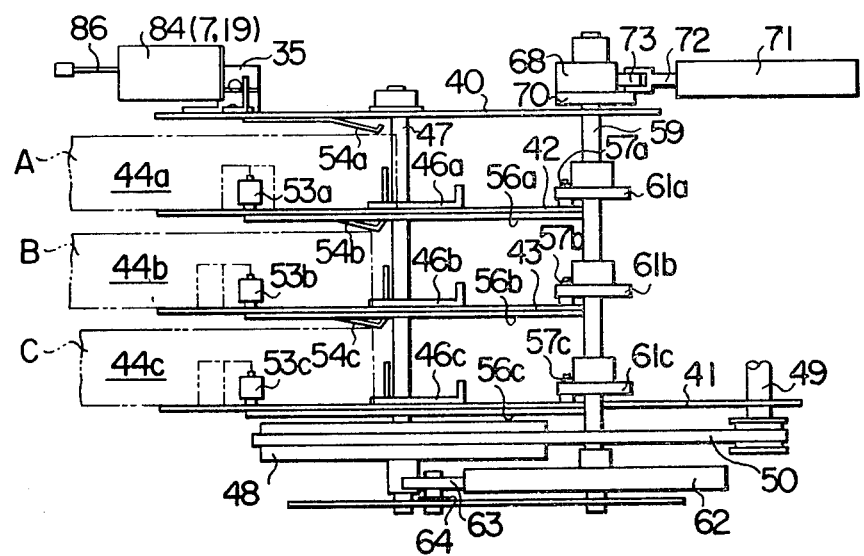
FIG. 2 is a side elevation, as viewed from right hand, showing a main part of the apparatus.

Firstly, a circuit diagram of FIG. 1 will be described hereinbelow.

In a reproducing circuit [I], heads $1a$, $1b$ and $1c$, each corresponding to three cartridges respectively, comprise four elements (1), (2), (3) and (4) respectively. A head change-over switch 2 consists of four switches 2-(1), 2-(2), 2-(3) and 2-(4) for selecting every respective element of a given head, the four switches, each having three contacts, being arranged to be interlocked each other. The head change-over switch 2 is actuated by a control mechanism which will be described hereinafter. Four amplifiers 3-(1), 3-(2), 3-(3) and 3-(4), each corresponding to each element of the heads, are provided for amplifying each input from the heads. Four terminals 4-(1), 4-(2), 4-(3) and 4-(4), each corresponding to each amplifier, are provided for individually picking out the reproducing output corresponding to each of LF (Left Front), LR (Left Rear), RF (Right Front) and RR (Right Rear) channels. An output change-over switch 5 having four terminals 5-(1), 5-(2), 5-(3) and 5-(4) is provided for gathering two of those terminals into the same channel when in two-channel reproducing. The terminals 5-(1) and 5-(3), and 5-(2) and 5-(4) are arranged to be interlocked each other respectively.

In a power source circuit [II], a transformer 8 is connected to an A.C. power source 6 via a power switch 7. Two rectifying diodes 9 and 10 are connected to the transformer 8 to rectify the output therefrom. A release switch 11 for releasing the reproducing state, at the interruption of the reproducing operation, is connected to the power source 6 in parallel with the power switch 7, and is arranged to be switched-on during the reproducing operation by the control mechanism which will be described hereinafter; switch 11 is arranged to be switched off when the reproducing state is released after the power switch is switched off.

In a program selective circuit [III], a repeat switch 12 is arranged to be switched off by the operation from outside, and is positioned between the power source circuit [II] and sensing switches 13a, 13b and 13c which are connected in parallel with one another, in such a way that each of the sensing switches corresponds to a respective cartridge. A program-change solenoid 14 is connected to the sensing switches to lift up and lower down the heads 1a, 1b and 1c at the end of each program, and is arranged to be operated when a sensing switch detects a corresponding sensing leaf on the tape in the cartridge. A switch 15 is provided for manually changing the program when it is manually switched to the terminal of the solenoid 14, the switch 15 being normally connected to the terminal of a cartridge selective circuit [IV], as shown.

In the cartridge selective circuit [IV], three switches 16a, 16b and 16c, each corresponding to one cartridge, are arranged to be switched off only when the cartridges are introduced to and retained to the reproducing position. A cartridge change-over switch 17 comprises three contacts 17-1, 17-2 and 17-3, the switch 17 being arranged to be interlocked with the head change-over switch 2. A solenoid 18 is provided for driving the control mechanism to which the current is fed via the switch 17. An auxiliary power switch 19 is provided for realizing the release of the reproducing state, basing upon the power switch 7 in the power source circuit [I], the switch 19 being arranged to be oppositely switched off when the switch 7 is switched on. A cartridge change-over switch 20 is provided for continuing the actuation of the solenoid 18 till the cartridge is completely changed over the switch 20 being arranged to be switched off only when any one of the cartridges is introduced and restrained to the reproducing position, by the control mechanism which will be described hereinafter. A switch 21 for manually changing over the cartridge is provided for actuating the solenoid 18 by the operation from outside. A switch 22 for selecting the timing on which the cartridge is changed over has four contacts, 22-1, 22-2, 22-3 and 22-4, the selective switch 22 being actuated by the solenoid 14 in the program selective circuit [III]. The contacts 22-1 and 22-3 are connected to the solenoid 18 side, and the contacts 22-2 and 22-4 are connected to the power source side. A condenser 23 for changing over the cartridge is connected to the switch 22. A switch 24 corresponding to the four-channel reproducing is connected in series to the contact 22-3, the switch 24 being arranged to be switched on only at four-channel reproducing.

In an indicating circuit [V], a switch 25 for changing over the indication has three contacts 25-1, 25-2 and 25-3, the switch 25 being interlocked with the head change-over switch 2. Three display lamps 26a, 26b and 26c are connected to each contact to indicate the selected cartridge. Three switches 27a, 27b and 27c, each corresponding to one cartridge, are provided for detecting the two-channel or four-channel reproducing, the switches 27a, 27b and 27c being arranged to be changed over to the two-channel detecting side, only when the two-channel cartridge is charged into anyone of spaces, since the two-channel cartridge is not provided with a slot for detecting the four-channel cartridge. A switch 28 arranged to be changed over by detecting the four-channel cartridge is arranged to be interlocked with the head change-over switch 2, the switch 28 having three contacts 28-1, 28-2 and 28-3. A lamp 29<2> for indicating the two-channel reproducing is connected to the four-channel detecting side of the detecting switches. A relay 30 is arranged to be operated, only when the display lamp 29<4> is turned on. The switches 5-(2) and 5-(4) in the reproducing circuit [I] are changed over in such a way that each of the output terminals 4-(1), 4-(2), 4-(3) and 4-(4) is independant, only when the relay 30 is actuated, whereby the switch 24 corresponding to the four-channel reproducing is switched on. A switch 31 for changing over the indication of the program is arranged to be interlocked with the switch 22, the switch 31 having four contacts 31-①, 31-②, 31-③ and 31-④. Four lamps 32-1, 32-2, 32-3 and 32-4 for indicating the reproducing program are connected to the contacts of the switch 31 respectively. A switch 33 for changing over the indication of the reproducing program is provided for connecting the contacts 31-3 and 31-4 of the switch 31 to the display lamps 32-① and 32-② respectively, only when the relay 30 is actuated. A head change-over relay 34 is actuated only when the display lamps 32-③ and 32-④ are turned on at two-channel reproducing. The switches 5-(1) and 5-(3) are changed over, only when the relay 34 is actuated.

In an automatic stopping circuit [VI], a solenoid 35 for automatically stopping the reproducing state is arranged to switch off the power switch 7 when the latter is switched on. A first automatic stopping switch 36 is provided for actuating the solenoid 35 after the last program of the cartridge on reproducing being over. When the first automatic stopping switch 36 is switched on by the operation from outside, the switch 36 is arranged to feed to the solenoid 35 the discharge current in the condenser 23 to be fed to the solenoid 18. A second automatic stopping switch 37 is arranged to actuate the solenoid 35 after the last program of the third cartridge being over. When the switch 37 is switched on by the operation from outside, the switch 37 is arranged to feed the discharge current of the condenser 38 to the solenoid 35. A switch 39 is provided for selecting the timing of the charge or discharge into the condenser 38, the switch 39 being arranged to be interlocked with the head change-over switch 2. The switch 39 has three contacts 39-1, 39-2 and 39-3, the contact 39-1 being connected to the second automatic stopping switch 37, and the contact 39-3 being connected to the power source side.

The embodiment applied to the above circuit arrangement will be described hereinafter with reference to the FIGS. 2 to 10. Firstly, referring to FIGS. 2 to 6, there are provided upper and lower base plates 40 and 41, and two partitions or intermediate plates 42, 43 equally spaced between the upper and lower plates to define three spaces 44a, 44b and 44c into which three cartridges A, B and C are inserted in such a way that those cartridges are stocked one above the other. There are provided in recesses of each space the heads 1a, 1b and 1c, the sensing switches 13a, 13b and 13c and the detecting switches 27a, 27b and 27c, along with three extruding springs 45a, 45b and 45c for returning each cartridge from the reproducing position to the waiting position, in such a way that they are corresponded to each cartridge. There are also provided in the same manner, the detecting switches 16a, 16b and 16c along with three intermediate levers 46a, 46b and 46c. One capstan 47 in common to all cartridges is provided through each of the spaces 44a, 44b and 44c, the capstan 47 also being positioned in the recesses of each space. A rotating motion of a driving shaft 49 is arranged to be transmitted via a belt 50 to a fly-wheel 48 of the capstan 47, which is positioned below the lower base plate 41. Thus, the cartridges A, B and C charged into each of the corresponding spaces are retained in the waiting position by means of guide rollers 51a and 52a, 51b and 52b, and 51c and 52c positioned at one side of each of the spaces, lock rollers 53a, 53b and 53c in opposite side to the guide rollers, and pressing springs 54a, 54b and 54c on the ceiling of each space. When any one of the lock rollers is engaged in any one of triangular concaves 55a, 55b and 55c provided at the side of each cartridge, the corresponding cartridge is advanced to the reproducing position, and is restrained thereto by the corresponding lock roller, and the pinch roller in the corresponding cartridge is urged against the capstan 47. Lock levers 56a, 56b and 56c are pivotally mounted on the intermediate plates 42, 43 and the lower base plate 41 respectively. At one end of each lock lever is mounted any one of the lock rollers, and at the other end is mounted any one of the driven rollers 57a, 57b and 57c. Each lock lever is arranged to be urged by each of the springs 58a, 58b and 58c toward such direction that each lock roller is urged against the corresponding cartridge.

Figure 7:
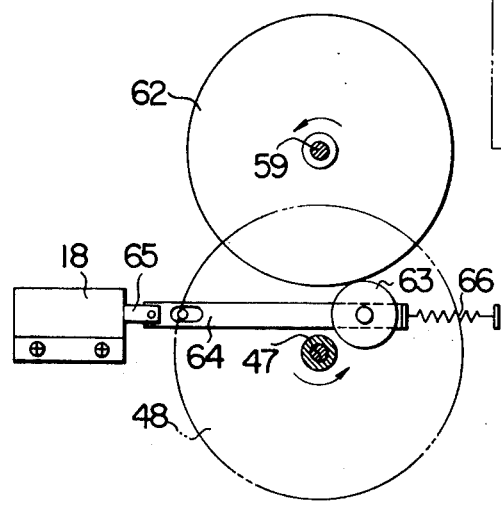
FIG. 7 is a plan view showing an arrangement of a relating driving part.
Figure 8:
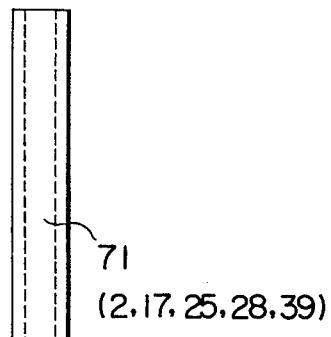
FIG. 8 is an enlarged plan view showing an arrangement of a switch change-over cam.

A camshaft 59 in the control mechanism for selecting the cartridge is supported through the upper and lower base plates 40 and 41. Between the upper and lower base plates each of the lock cams 61a, 61b and 61c having at the periphery thereof a concave 60 upon the stepped periphery is rigidily mounted on the camshaft, in corresponding to each of the lock levers 56a, 56b and 56c respectively, each lock cam having a phase difference of 120°, in turn from the uppermost lock cam. Except when any one of the driven rollers 57a, 57b and 57c attached on each lock lever is engaged into the corresponding concave 60 of the lock cam, each lock cam is arranged to swing the corresponding lock lever against the force of corresponding one of the springs 58a, 58b or 58c toward such direction that the lock roll is returned. As shown in FIG. 7, the rotating motion from the capstan 47 is transmitted to the camshaft 59 via an idler 63 positioned between the fly-wheel 62 attached at lower end of the camshaft and the boss portion of the fly-wheel 48 of the capstan. The idler 63 is related to a plunger 65 of the solenoid 18 via a link 64 supporting the idler 63, which is arranged to be urged against both of the fly-wheels when the solenoid 18 is actuated, otherwise the idler being arranged to be retreated by force of a spring 66. And on the upper end of the camshaft 59 are rigidly mounted a switch change-over cam 68 which is provided with at periphery thereof highest, middle and lowest cam slopes 67a, 67b and 67c, each having a phrase difference of 120° as shown in FIG. 8, and a cam 70 for opening and closing the switches 11, 20, which is provided at periphery thereof with three projections 69a, 69b and 69c, each having a phrase difference of 120°. A switch bar 72 of an interlocked switch 71 compounded in such a way that each switch, each having three contacts, i.e., four head change-over switches 2-(1), 2-(2), 2-(3) and 2-(4), the change-over switches 17 and 28, and the selective switch 39 are interlocked one another, is positioned in such a way that a driven roller 73 at the tip of the bar 72 is in contact with the switch change-over cam 68. The switch bar 72 is set up in such a way that the roller is into contact with the lowest cam slope 67a to coincide each of the switches included in the interlocked switch 71 with each contact $^r1$, of each switch, when the cartridge A is introduced and restrained to the reproducing position. The release switch 11 and the change-over switch 20 are positioned in such a way that the cam 70 is in contact with the driven levers 74 and 75 of the switches 11 and 20 respectively. The driven levers 74 and 75 are set up respectively in such a way that when any one of the cartridges is introduced and restrained into the reproducing position, the driven lever 74 of the release switch 11 is released from any one of the projections of the cam 70 to switch on the release switch 11, and at the same time the driven lever 75 of the change-over switch 20 is pushed by any one of the projections of the cam 70 to switch off the change-over switch 20.

Figure 3:
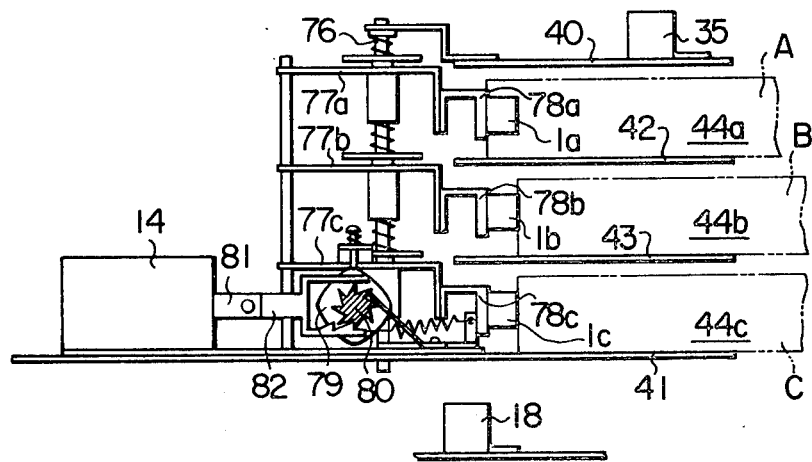
FIG. 3 is a side elevation, as viewed from left hand, of the main part shown in FIG. 2.
Figure 6:
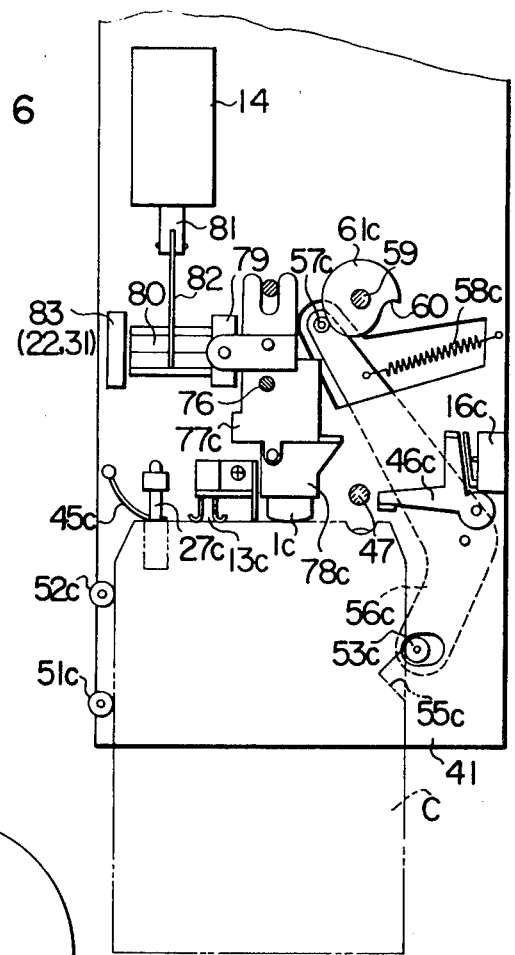

A rod 76 for supporting the heads in a lifting mechanism for selecting the program is liftably supported with respect to the upper and lower base plates 40 and 41, as shown in FIG. 3. The heads 1a, 1b, and 1c are supported at the tip of each of supporting plates 77a, 77b and 77c mounted on the rod 76, via individual attaching bases 78a, 78b and 78c. A lifting cam 79 is provided for lifting up the rod 76 in two steps. The cam 79 is provided with a ratchet wheel 80 on a common axis as shown in FIGS. 3 and 6. Each time the solenoid 14 is actuated, a feed click 82 connected to a plunger 81 is reciprocated once to rotate the cam 79, so that the rod 76 is raised or lowered. In a rotary switch 83 positioned at the other end of the ratchet wheel 80 as shown in FIG. 6, are received the selective switch 22 and the changeover switch 31; the rotary switch 83 is arranged to be rotated by one contact each time the rod 76 is raised or lowered. A switch case 84 shown in FIGS. 2 and 10 receives therein the power switch 7 and the auxiliary power switch 19. A release lever 85 for switching off the switched on power switch 7 is provided separately from an actuating rod 86 for the switches 7 and 19. When the solenoid 35 is actuated, the lever 85 is arranged to be actuated via a link 88 connected to a plunger 87 of the solenoid 35.

FIG. 11 shows the relationship between the rotating angle of the control camshaft 59, and the restraining state of the cartridge controlled by the camshaft and the continuous state of each switch, the shaded portion in the figure showing the state switched on or restrained.

The multi-cartridge apparatus for recording and reproducing audio signals automatically and successively constituted as above-described is operated as follows. With the power switch 7 switched off, the cartridges A, B and C are inserted into the corresponding spaces 44a, 44b and 44c respectively. At this time, as described below, the control camshaft 59 is rotated only about one half, i.e., 60° of the required angle for once selection of the cartridge by the action of the release switch 11 at the finishing of last stop. Accordingly, the lock rollers 53a, 53b and 53c are in the retracted position by the action of each lock cam 61a, 61b and 61c, and each cartridge can to be readily inserted into each corresponding space; even if each cartridge is over-pressed, it is returned to the waiting position by the action of any of the springs 45a, 45b and 45c.

Thereafter, when the power switch 7 is switched on, the current is fed to the solenoid 18 to actuate the plunger 65, since the change-over switch 20 is already switched on by any one of the projections of the cam 70, in relation to the stopped angle of the control camshaft 59 as above-described, so that the idler 63 is urged against both of the fly-wheels 48 and 62 via the link 64, and the rotating motion is transmitted to the control camshaft 59 while decreasing the rotating speed.

Figure 9:
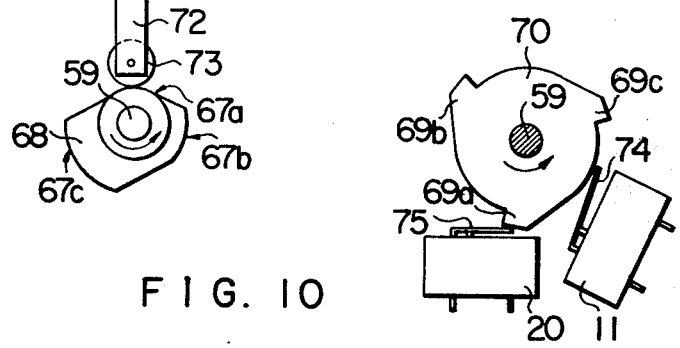
FIG. 9 is an enlarged plan view showing an arrangement of a cam for opening and closing switches.
Figure 10:
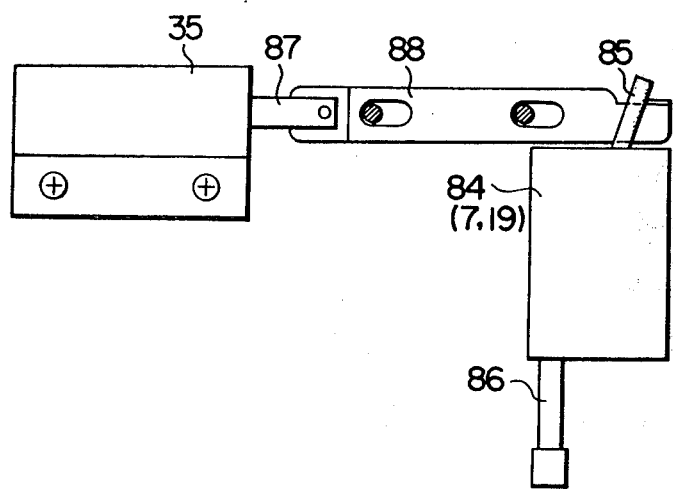
FIG. 10 is an enlarged plan view showing an arrangement of a power switch.

Setting on in such a way that the driven roller 57a is engaged into the concave 60 of the lock cam 61a when the control camshaft 59 is rotated over the remainded angle, i.e., about 60° of the rotated and at the last stop of the required rotating angle for once selection of the cartridges, the lever 56a is swung by the spring 58a to engage the lock roller 53a into the triangular concave 55a of the cartridge A, so that the cartridge A is introduced into the reproducing position against force of the spring 45a, and the pinch roller in the cartridge A is urged against the capstan 47, and the head 1a and the sensing switch 13a are engaged into the cartridge A, at the same time, the detecting switch 16a is switched off via the intermediate lever 46a. And in this time, the driven roller 73 of the switch 71 is urged against the lowest cam slope 67a of the switch change-over cam 68 as shown in FIG. 8, so that the switches 2, 17, 25, 28 and 39 included in the switch 71 are all changed over to the respective contact 1, at the same time, the change-over switch 20 which has been switched on is switched off by any one of the projections of the cam 70 as shown in FIG. 9. Thus in this time, the auxiliary power switch 19 in parallel with the cartridge change-over switch 20, the change-over switch 21 and the detecting switch 16a are switched off, so that at this time the current is not fed to the solenoid 18. Accordingly, the ilder 63 interrupts the communication between the fly-wheels 48 and 62, so that the control camshaft 59 is stopped in the situation that the cartridge A is to be reproduced, and the cartridge A is restrained in the reproducing position by the lock roller 53a. As a result, the reproducing of the cartridge A is started by the head 1a, and this is indicated by that the display lamp 26a is turned on through the change-over switch 25.

Where the cartridge A is the two-channel cartridge, the detecting switch 27a is changed over to the two-channel detecting side, since the two-channel cartridge is not provided with a slot for detecting the four-channel cartridge. While, where the cartridge A is the four-channel cartridge, the switch 27a is not changed over to the two-channel detecting side, since the four-channel cartridge is provided with the slot. Therefore, at the same time when the cartridge A is restrained by the lock roller 53a, in the former case, the lamp 29<2> for indicating the two-channel reproducing is turned on, while in the latter case, the lamp 29<4> for indicating the four-channel reproducing is turned on, whereby it is indicated whether the reproducing to be started is the two-channel or four-channel reproducing. Thus, when the lamp 29<2> is turned on, it is continued that the output change-over switches 5-(2) and 5-(4) are changed over to the output terminals 4-(1) and 4-(2), since the relay is not actuated, so that L (Left)-channel reproducing output obtained by the amplifier 3-(1) is derived from the output terminals 4-(1) and 4-(2), and R (Right)-channel reproducing output obtained by the amplifier 3-(3) is derived from the output terminals 4-(3) and 4-(4). However, when the lamp 29(4) is turned on, the output change-over switches 5-(2) and 5-(4) are changed over to the amplifiers 3-(2) and 3-(4), since the relay 30 is actuated, so that each reproducing output of LF, LR, RF and RR channels obtained from the amplifiers 3-(1), 3-(2), 3-(3) and 3-(4), is output from the output terminals 4-(1), 4-(2), 4-(3) and 4-(4) respectively.

At the start of the reproducing, if each of the switches 22 and 31 in the rotary switch 83 is changed over to the contacts 22-1 and 31-1 respectively, the head 1a is lifted up by the lifting cam 79 as shown in FIG. 3 so that the head may correspond to the program ① of the cartridge A, whereby the reproducing is started with the program 1 and the lamp 32-1 is lighted through switch 31.

When the reproducing of the program①in the cartridge A is over, the sensing switch 13a corresponding to the cartridge A is temporarily turned on upon sensing the sensing leaf or foil provided on the tape, so that only for a short period, current is fed to the solenoid 14, and the feed click 82 is reciprocated once by the actuation of the plunger 81 to feed the ratchet wheel only one step.

Then the cam 79 is rotated only one step to lower the supporting rod only for one track, so that the head 1a which has reproduced the program①is corresponded to the program 2.

Thus, when the ratchet wheel 80 is rotated as described, the rotary switch 83 is also rotated to change-over switch 31 to the contact 31-2.

At this time, the reproducing with the cartridge A is automatically changed to the program②from the program ① to start the reproducing on the program ②. This is indicated by the lamp 32-2 which is lighted substituting for the lamp 32-1.

At the same time, the switch 22 is also changed to the contact 22-2 from the contact 22-1, so that the condenser 23 is connected to the power side to be charged.

When the reproducing is finished with the program ②, the sensing switch 13 is temporarily turned on upon sensing the passage of sensing foil or leaf on the tape, so that the current is again fed to the solenoid 14, ad the head 1a is returned to the original position by the rod 76 which is lifted up for one track by the rotation of the cam 79.

At this time, the rotary switch 83 is also rotated to change-over each of the switches 22, 31 to the contacts 22-3, 31-3 respectively.

Thus, where the cartridge A is for four-channels, the switch 24 corresponding to the four channel reproducing is turned on by the actuation of the relay 30, at the same time the switch 33 is already changed such that the contacts 31-3 and 31-4 of the switch 31 are connected to the lamps 32- ① and 32- ② respectively, so that the condenser 23 which has been charged turns to discharge through the contact 22-3 of the switch 22.

Needless to say, the lamp 32- ② is turned off while the lamp 32- ① is turned on again.

However, when the cartridge A is for two-channels, the condenser 23 cannot discharge since the relay 30 is not actuated in such a case, so that the lamp 32-③ is lighted substituting for the lamp 32-②. Then the relay 34 is energized so that the output change-over switches 5-(1) and 5-(3) are change-over so that the output terminals 4-(1) and 4-(2), and 4-(3) and 4-(4) select the amplifiers 3-(2) and 3-(4) in place of the amplifiers 3-(1) and 3-(3).

As a result, L-channel reproducing output delivered from the amplifier 3-(2) is output from the output terminals 4-(1), 4-(2), and R-channel reproducing output delivered from amplifier 3-(4) is output from the output terminals 4-(3), 4-(4).

Accordingly, in this case, in spite of returning of the head 1a to the original position, the reproducing on the cartridge A is changed-over to the program ③ from the program ②, accordingly the reproducing is started with the program ③.

Further, when the reproducing of the program ③ is over, the sensing switch 13a is switched on in the same manner as where the reproducing of the program ① is over, so that the head 1a is lowered, and the reproducing of the program ③ is changed-over to the program ④, at the same time the lamp 32-④ is turned on while the lamp 32-③ is turned off to represent this situation.

The condenser 23 is charged again through the contact of the switch 22.

In the case of using a cartridge for two channels, the sensing switch 13a is again switched on to lift the head 1a up, as the reproducing is finished with the program ④.

At this time, the lamp 32-① is again turned on upon returning of the switch 31 to the contact 31-1, also the switch 31 is returned to the contact 22-1, so that the condenser 23 which has been charged through the contact 22-4 in turn discharges through the contact 22-1.

If the cartridge A employed were for four channels, the sensing switch 13a is switched on as the reproducing with the program ② so that the head 1a is lifted up and the lamp 32-① is turned on, though the switch 31 is changed to the contact 31-3. At the same time, the switch 22 is changed over to the contact 22-3, so that the condenser which has been charged in turn discharges through the switch 24 corresponding to the four-channel mode, which is switched on as the switch 22 is changed-over to the contact 22-3.

Upon discharging of the condenser (23), the discharge current is fed to the solenoid 18 assuming that the first automatic stopping switch 36 is not changed over, so that the idler 63 is again pressed against both flywheels 48, 62.

Then, the cam shaft 59 starts to rotate to release the projection of the cam 70 from the lever 75 of the switch 20 to make it turn on, thereby the current from the condenser 23 is stopped, but the current is safely fed to the solenoid 18 through the switch 20, so that the idler 63 may continue the torque transmitting.

As the cam shaft 59 is rotated, the lock cam 61a of the cam shaft 59 comes to act to push out the roller 57a from the recess 60 to rotate the lock lever 56a against the force of the spring 58a, thereby the lock roller 53a is released from the recess 55a of the cartridge A. Thus, the cartridge A is released from the working position to the waiting position by the force of the spring 45a, with the detecting switch 16a being returned to on.

Thereafter, the control cam shaft 59 is rotated further, and when the rotating angle is achieved to 120°, assuming that the roller 57b of the lock lever 56b is engaged in the recess 60 of the lock cam 61b, the lever is swung by the spring 58b to engage the lock lever 53b into the triangular concave 55b of the cartridge B, so that the cartridge is introduced to the reproducing position against the spring 45b, and the pinch roller in the cartridge B is urged against the capstan 47. At the same time, the head 1a and the sensing switch 13b are engaged into the cartridge B, and the switch 16b is switched off through the intermediate lever 46b. And in this time, the driven roller 73 of the switch 71 is urged against the middle cam slope 67b of the cam 68, so that each of the switches 2, 17, 25, 28 and 39 included in the switch 71 is all changed over to the respective contact 2. At the same time, the switch 20 which has continued to be switched on is switched off by any one of the projections of the cam 70. As the result, the current is not fed to the solenoid 18 to release the idler 63, so that the control camshaft 56 is stopped, and the cartridge B is restrained to the reproducing position by the lock roller 53b.

Accordingly, when all programs of the cartridge A are over, at the time on which the program ① just after the program ④ of the cartridge A is returned to the reproducing position, the cartridge to be reproduced is automatically changed from the cartridge A to the cartridge B, and in succession, the reproducing on the program ① of the cartridge B is started. This is indicated by that the lamp 26b is turned on in changing to the lamp 26a.

Thereafter, in the same manner, when the reproducing of all programs of the cartridge B is over, the cartridge B is released from the reproducing position, and next cartridge C is introduced and restrained to the reproducing position to start the reproducing on the cartridge C by the head 1c. When the reproducing of all programs of the cartridge C is over, the reproducing of the cartridge A is again started. When the cartridge B is selected as above-described, if the cartridge B is not existed in the corresponding space, it is continued that the current is fed to the solenoid 18 via the switch 16b, even if the switch 20 is switch off, since the switch 16b is not switched off. This operation is accompanied by that the control camshaft 59 is situated in the reproducing position of the cartridge C. The function which automatically skips over the non-existing cartridge is also displayed by the action of the switches 16a and 16c, where either of the other cartridges C and A is not existed in the corresponding space.

At automatic successive reproducing of each cartridge as above-described, where the repeat switch 12 is switched off by the operation from outside, even if the program on reproducing is over, and any one of the sensing switches 13a, 13b and 13c is switched on, the current is not fed into the solenoid 14, so that the rod 76 is not lifted up, and the rotary switch 83 may be not changed over. Accordingly, when the program is over, the reproducing of the same program is again started, i.e., the repeat reproducing is started.

And also in producing, when the switch 15 is changed over to the solenoid 14 by the operation from outside, the solenoid 14 is actuated in the same manner as where the sensing switch is switched on, so that the rod 76 is lifted up or lowered down, and the rotary switch 83 is also rotated such that the rotary switch is changed over to the next contact. Accordingly, the program on reproducing is interrupted at this time without waiting the end of the reproducing, and the program is changed over to the next program.

Further, at reproducing, when the switch 21 is switched on, the solenoid 18 is actuated in the same manner as where the condenser 23 is discharged, whereby the solenoid 18 is cooperated with the switch 20 to rotate the control camshaft 59. Therefore the cartridge on reproducing is released from the reproducing state at this time without waiting the end of the reproducing of all programs, and the next cartridge is introduced and restrained to the reproducing position to reproduce the next cartridge.

In the case of the two-channel reproducing, when the switch 22 is changed over to the contact 22-1 from the contact 22-4, and the condenser 23 is discharged. And in the case of the four-channel reproducing, when the switch 22 is changed over to the contact 22-3 from the contact 22-2 and to the contact 22-1 from the contact 22-4, the condenser 23 is discharged. So, at reproducing, in the case where the automatic stopping switch 36 is changed over to the solenoid 35 side, when the reproducing on all programs of the cartridge on reproducing is over, the discharge current from the condenser is fed to the solenoid 35 not to the solenoid 18 to retreat the release lever 85 in the switch case 84 via the link 88 by the actuation of the plunger 87, so that the power switch 7 in the case 84 is switched off. Thus, the reproducing is automatically stopped when the reproducing of all programs of the cartridge on reproducing is over.

Further, the condenser 38 is set up in such a way that the condenser is charged when the switch 39 is changed over to the contact 39-3, and is discharged when the switch 39 is changed over to the contact 39-1. Thus, where the second automatic stopping switch 37 is switched on, the reproducing is continued till all programs of the third cartridge C is over, even if any of the cartridges are in the reproducing state. When the reproducing on the cartridge C is over, the discharge current from the condenser 38 is fed to the solenoid 35 in the same manner as above-described, so that the power switch 7 is switched off in the same manner. Accordingly, in this case, regardless of the timing on which the switch 37 is switched on, only when all programs of the cartridge C are over, the next reproducing is automatically stopped, and is not stopped at when the reproducing of the other cartridge is over.

When the power switch 7 is switched off by feeding the current into the solenoid 35, or by the manual operation of the actuating lever 86, the auxiliary power switch 19 interlocking with the power switch 7 is switched on. When any one of the cartridge is in the reproducing state, the release switch 11 is already switched on, the state is not changed in only case where the power switch 7 is switched off. Accordingly, when any one of the cartridges is in the reproducing state, where the power switch 7 is switched on, the power circuit [II] is yet not powered on via the release switch 11. Therefore, the current is fed to the solenoid via the auxiliary power switch 19 from when the power switch is switched off, whereby the control camshaft 59 is rotated. Then the lock cam corresponding to the cartridge on reproducing pushes out the driven roller from its concave to swing the lock lever, whereby the lock roller is released from the triangular concave of the cartridge, so that the cartridge is released from the restrained situation, and is returned to the reproducing position, in succession, to the waiting position by the spring. Thereafter, any one of the projections of the cam 70 is urged against the driven lever 74 of the release switch 11 to switch off the switch 11, so that the power source circuit [II] is completely powered off at this time. Accordingly, any function of the apparatus is all stopped. Thus, each cartridge stopped in such manner is in the waiting position in each corresponding space, and is not restrained by any of the lock rollers, therefore each cartridge is able to be pulled out easily from each space.

As above-described, according to the present invention, various problem or disadvantages in the prior apparatus of multi-cartridge type for automatically and successively recording and reproducing are completely solved or eliminated, and it will be understood that the apparatus according to the present invention has not only a functional reliability, but some convenient function in practice.

What is claimed is:

1. An apparatus for recording and reproducing audio signals automatically and successively from a plurality of cartridges, comprising:
    cartridge receiving means having a plurality of spaces defined by at least one partition wall provided between upper and lower base plates, each space receiving one cartridge therein;
    transducing head means and cartridge sensing switch means mounted in each cartridge receiving space;
    bias means mounted in each cartridge receiving space for normally urging a cartridge in a cartridge receiving space out of engagement with the corresponding transducing head means and sensing switch means;
    cartridge moving means mounted in each cartridge receiving space for selectively moving a cartridge in that space into an operating position in contact with the corresponding transducing head means and against the force of said bias means, said cartridge moving means including a locking lever pivotally mounted for movement in the corresponding cartridge receiving space and having a lock roller mounted at one end portion for engagement with a recess in the corresponding cartridge, means coupled to said lock lever for urging the lock lever in a direction of movement such that said lock roller contacts said cartridge, a locking cam having a cam slope which contacts the other end portion of said locking lever, each locking cam being mounted on a common control cam shaft such that the cam slope of each locking cam is angularly offset from each other locking cam slope; and
    control means coupled to said control cam shaft to rotate said cam shaft upon a predetermined control signal to selectively control the movement of said cartridges into and out of engagement with their corresponding transducing head means.

2. The apparatus according to claim 1, further comprising: transducing head change switch means for switching said transducing head means into operation in correspondence with a selected cartridge and a switch change cam mounted on said control cam shaft to actuate said transducing head change switch means upon rotation of said control cam shaft.

3. The apparatus according to claim 2, wherein said switch change cam has a plurality of cam slopes which correspond to the number of cartridge receiving spaces in said apparatus, said switch change cam slopes being arranged to operate said head change switch means in a predetermined order upon rotation of said control cam shaft.

4. The apparatus according to claim 2, further comprising:
    a main power switch;
    power control solenoid operated means coupled to said main power switch;
    a storage capacitor; and solenoid control switch means coupled between said power control solenoid means and said storage capacitor and further coupled to said head change switch means, said solenoid control switch means having a first operating position for charging said storage capacitor when said head change switch means is in a position for selecting the last available cartridge operating position and a second operating position for discharging said capacitor through said power control solenoid means when said head change switch means is in a position for selecting the first available cartridge operating position.

5. The apparatus according to claim 2, further comprising indicating means for indicating the presence of a cartridge in its operating position, said indicating means comprising a plurality of indicating lamps corresponding to the number of cartridge receiving spaces in said apparatus, and indicating lamp switch means coupled to said indicating lamps and operated by said switch change cam to energize the indicating lamp corresponding to said selected cartridge.

6. The apparatus according to claim 2, further comprising:
   detecting means corresponding to each cartridge receiving space for distinguishing between two-channel and four-channel tapes in said cartridges;
   a detecting means switch interlocked with said head change switch means for selecting the detecting means corresponding to the cartridge receiving space containing the selected cartridge located in its operating position; and
   a pair of indicating lamps coupled to said detecting means for indicating the presence of two-channel and four-channel tapes, respectively, in the selected cartridge.

7. The apparatus according to claim 6, further comprising:
   first circuit means coupled to said transducing head means for recording and reproducing information onto and from tapes in said cartridge in a four-channel mode;
   second circuit means coupled to said transducing head means for recording and reproducing information onto and from tapes in said cartridges in a two-channel mode; and
   relay operated switch means coupled to said detecting means and to said first and second circuit means for switching said first and second circuit means into and out of operation as a function of the tape mode detected by said detecting means.

8. The apparatus according to claim 1, further comprising:
   a control solenoid;
   means coupling said control solenoid to said control cam shaft for rotating said control cam shaft when said control solenoid is energized;
   a main power switch and a second power switch coupled in parallel with said main power switch;
   auxiliary switch means coupled to said control solenoid and to said second power switch for providing a current path to said control solenoid when said main power switch is open; and
   a solenoid control cam mounted on said control cam shaft for closing said second power switch upon rotation of said control cam shaft to a position in which all cartridges are moved out of their respective operating positions.

9. The apparatus according to claim 8, wherein said solenoid control cam comprises a plurality of projections corresponding to the number of said locking cams, said projections engaging said second power switch to close said second power switch when the control cam shaft is rotated to said position in which all cartridges are moved out of their respective operating positions.

10. The apparatus according to claim 1, wherein said control means comprises:
    tape sensing means located in each cartridge receiving space for sensing the presence of signal means provided on the tape of a first cartridge located in its operating position; and
    control shaft rotating means coupled to said tape sensing means to rotate said control shaft upon receipt of an output signal from said tape sensing means to release said first cartridge from its operating position and to move a second cartridge into its operating position.

11. The apparatus according to claim 10, further comprising means coupled to said control shaft rotating means to manually energize said rotating means to rotate said control shaft when an output signal from said tape sensing means is absent.

12. The apparatus according to claim 10, further comprising means coupled to said tape sensing means to selectively disable said tape sensing means and inhibit an output thereof from activating said control shaft rotating means.

13. The apparatus according to claim 10, wherein said control means further comprises:
    a control solenoid;
    means coupling said control solenoid to said control cam shaft to rotate said control cam shaft when said control solenoid is energized;
    a normally closed cartridge change switch coupled to said control solenoid for supplying electrical current to said control solenoid; and
    a cartridge change switch cam mounted on said control cam shaft for opening said cartridge change switch when said control cam shaft is rotated to a position in which a cartridge is moved into its operating position.

* * * * *